United States Patent
Tian et al.

(10) Patent No.: US 8,498,194 B2
(45) Date of Patent: Jul. 30, 2013

(54) METHOD AND DEVICE FOR CONTROLLING UPLINK POWER

(75) Inventors: Chunchang Tian, Beijing (CN); Jing Jin, Beijing (CN); Yafeng Wang, Beijing (CN); Guangyi Liu, Beijing (CN); Xiaodong Shen, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 273 days.

(21) Appl. No.: 12/936,459

(22) PCT Filed: Mar. 30, 2009

(86) PCT No.: PCT/CN2009/000341
§ 371 (c)(1),
(2), (4) Date: Oct. 25, 2010

(87) PCT Pub. No.: WO2009/124459
PCT Pub. Date: Oct. 15, 2009

(65) Prior Publication Data
US 2011/0032813 A1 Feb. 10, 2011

(30) Foreign Application Priority Data
Apr. 7, 2008 (CN) .................. 2008 1 01034781

(51) Int. Cl.
*H04L 12/26* (2006.01)

(52) U.S. Cl.
USPC .......................................................... 370/203

(58) Field of Classification Search
USPC ........................................ 370/203, 204, 208
See application file for complete search history.

(56) References Cited

U.S. PATENT DOCUMENTS
2007/0171808 A1 7/2007 Wu et al.
2008/0032746 A1 2/2008 Olesen et al.

FOREIGN PATENT DOCUMENTS
CN 1773901 5/2006

OTHER PUBLICATIONS
International Search Report for International Application No. PCT/CN2009/000341, dated Jun. 21, 2009.

*Primary Examiner* — Mark Rinehart
*Assistant Examiner* — Mohammad Anwar
(74) *Attorney, Agent, or Firm* — Barnes & Thornburg LLP

(57) ABSTRACT

A method for controlling uplink power is provided, which is used for implementing the uplink power control of the virtual multiple input multiple output system, so as to save the system resource. The method includes: determining at least two user equipments being paired in a virtual multiple input multiple output system; and in accordance with the orthogonality of the at least two user equipments, adjusting at least the power of one of the user equipments. In addition, a device for implementing the method is provided.

11 Claims, 3 Drawing Sheets

METHOD AND DEVICE FOR CONTROLLING UPLINK POWER

CROSS-REFERENCE TO RELATED APPLICATIONS

The present application is a US National Stage of International Application No. PCT/CN2009/000341, filed 30 Mar. 2009, designating the United States, and claiming priority to Chinese Patent Application No. 200810103478.1 filed 7 Apr. 2008.

FIELD OF THE INVENTION

The present invention relates to the field of communication technology, and in particular, to a method and a device for controlling uplink power.

BACKGROUND OF THE INVENTION

With the rapid development of multimedia communication over wireless Internet, it is urgently needed to improve the capacity and reliability of a wireless communication system, and a conventional single-antenna transceiving communication system is challenged. The conventional technologies of transmit diversity, receive diversity or smart antenna have been inadequate to meet the requirements of a large capacity and high reliability of the new-generation wireless communication system. The above problem is solved with the appearance of a Multiple Input Multiple Output (MIMO) system. For the MIMO system, the channel capacity is increased linearly with the number of antennas, in other words, the wireless channel capacity may be increased by folds by employing MIMO channels; the spectrum utilization may be increased by folds without increasing the bandwidth and the antenna transmission power; however, the application of the MIMO system is limited due to the limited number of antennas on the terminal side. At present, based on the MIMO technology, a virtual MIMO technology has been developed to further increase the system performance. In the virtual MIMO technology, a plurality of user equipments with a small number of antennas are configured into a multi-antenna system, so that said plurality of user equipments may use the same time/frequency resources, thus the system throughput may be increased and the network Quality of Service may be improved.

A traditional Adaptive Power Control (APC) method includes that: all users are provided with preset power control thresholds; a carrier-to-interference ratio of a target signal is measured and compared with the preset threshold at the network side, and if the carrier-to interference ratio is higher than the preset threshold, a transmission power level is lowered and setting of Adaptive Modulation and Coding (AMC) is determined; otherwise, the transmitter increases the transmission power level (provided that the transmission power does not reach the maximum allowable value) and determines the setting of AMC. Thus, it can be seen that the existing power control processes are all directed to a single user equipment, and the power control of a certain user equipment takes consideration of channel conditions of said certain user equipment merely.

At present, there exists no uplink power control solution directed to the virtual MIMO system. If the traditional power control mode is employed in the virtual MIMO system, a relatively large interference may be caused between user equipments, the data transmission quality may be influenced, and system resources may be wasted.

SUMMARY OF THE INVENTION

The embodiments of the invention provide a method and a device for controlling uplink power, which are used for implementing the uplink power control of a virtual MIMO system, so as to save the system resources.

An embodiment of the invention provides a method for controlling uplink power, including:
  determining at least two user equipments to be paired in a virtual MIMO system; and
  adjusting power of at least one of the user equipments according to orthogonality between the at least two user equipments.

An embodiment of the invention provides a device for controlling uplink power, including:
  an obtaining module, adapted to determine at least two user equipments to be paired in a virtual MIMO system;
  a calculating module, adapted to determine a size of by which power for the at least two user equipments is to be adjusted according to orthogonality between the at least two user equipments; and
  an adjusting module, adapted to adjust power of at least one of the user equipments according to the determined size by which the power is to be adjusted.

An embodiment of the invention provides a system for controlling uplink power, including:
  at least two user equipments; and
  an equipment on network side, adapted to determine at least two user equipments to be paired in a virtual MIMO system and adjust power of at least one of the user equipments according to orthogonality between the at least two user equipments.

In the embodiments of the invention, power control is carried out by taking the paired UEs in a virtual MIMO system as a whole, the orthogonality of power distribution therebetween is met as best as possible, so that the interference between the UEs is reduced, the transmission quality is improved, and the waste of system resources caused by meaningless power increase is reduced.

DETAILED DESCRIPTION OF THE EMBODIMENTS

In an embodiment of the invention, a plurality of user equipments (UEs) to be paired in a virtual MIMO system are determined, then the uplink power of at least one of the UEs is adjusted depending on the orthogonality between the plurality of UEs. Provided that the interference between UEs is kept as small as possible, the transmission quality is ensured by the adjustment of power, and the waste of resources caused by an excessive power increase is avoided.

Figure 1:
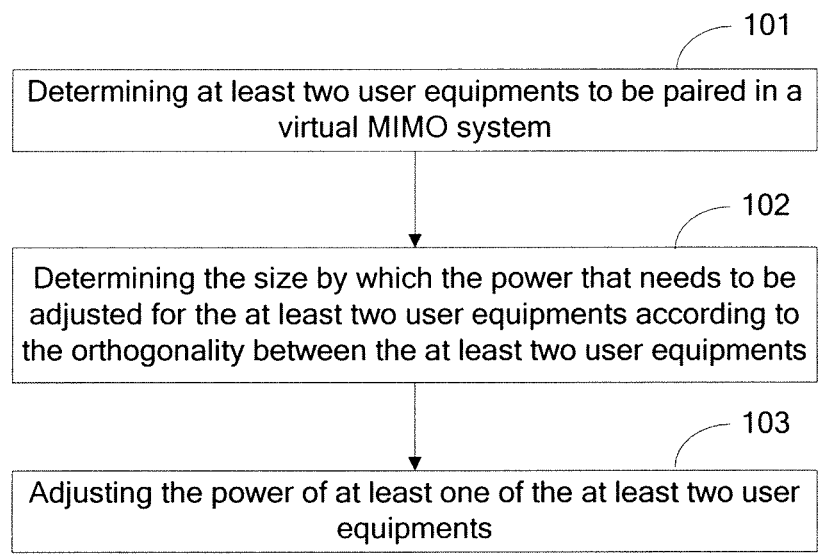
FIG. 1 is a main flow chart of a method for controlling uplink power according to an embodiment of the invention.

Referring to FIG. 1, the main flow of a method for controlling uplink power according to an embodiment is as follows.

Process 101: At least two user equipments to be paired in a virtual MIMO system are determined. The at least two user equipments to be paired may be selected in any pairing mode, for example, a random pairing mode or an orthogonal pairing mode.

Process 102: The size by which the power that needs to be adjusted for the at least two user equipments is determined according to the orthogonality between the at least two user equipments.

Process 103: The power of at least one of the at least two user equipments is adjusted.

In this embodiment, the orthogonality between the plurality of UEs is determined by constructing a channel matrix of the plurality of UEs and further obtaining an orthogonal matrix.

The construction of the channel matrix is described below. In the case of two UEs (such as UE1 and UE2), for example, the channel matrix $H_n$ in a 2×2 virtual MIMO system may be represented as:

$$H_n = \begin{bmatrix} \sqrt{P_1 L_1}\, h_{n,11} & \sqrt{P_2 L_2}\, h_{n,12} \\ \sqrt{P_1 L_1}\, h_{n,21} & \sqrt{P_2 L_2}\, h_{n,22} \end{bmatrix} \quad \text{Formula 1}$$

Where, n represents the index of the $n^{th}$ subcarrier, $P_1$ and $P_2$ represent expected transmission power of UE1 and UE2, respectively, L and h represent two factors influencing the channel quality, $L_1$ and $L_2$ represent the sums of propagation loss and shadow fading of UE1 and UE2, respectively, and $h_{11}$, $h_{12}$, $h_{21}$ and $h_{22}$ respectively represent the fast fading from each of two transmitting antennas to each of two receiving antennas; however, the factors influencing the channel quality are not limited to the above, and the embodiment is illustrated by taking the two factors L and h as an example.

When the channel matrix $H_n$ is orthogonal, the orthogonality between UE1 and UE2 is the best, that is, the orthogonality between UE1 and UE2 is embodied by the orthogonality of the channel matrix $H_n$; in this case, the interference between UE1 and UE2 is the least, and a perfect spatial multiplexing effect can be achieved. To achieve an orthogonal channel matrix $H_n$, a matrix $F_n = H_n^H H_n$ is needed to be calculated, where the superscript H represents the conjugate transposition of the matrix. After each parameter is substituted in the matrix $F_n$, the following formula is obtained.

$$\begin{aligned}
F_n &= H_n^H H_n \\
&= \begin{bmatrix} f_{11} & f_{12} \\ f_{21} & f_{22} \end{bmatrix} \\
&= \begin{bmatrix} P_1 L_1 (|h_{n,11}|^2 + |h_{n,21}|^2) & \sqrt{P_1 L_1 P_2 L_2}\,(h_{n,11}^* h_{n,12} + h_{n,21}^* h_{n,22}) \\ \sqrt{P_1 L_1 P_2 L_2}\,(h_{n,11} h_{n,12}^* + h_{n,21} h_{n,22}^*) & P_2 L_2 (|h_{n,12}|^2 + |h_{n,22}|^2) \end{bmatrix}
\end{aligned} \quad \text{Formula 2}$$

When the matrix $F_n$ is a diagonal matrix, the channel matrix $H_n$ is an orthogonal matrix. Thus, Formula 3 needs to be of the minimum value, and the relationship between $P_1$ and $P_2$ needs to be derived.

$$f = \frac{|f_{12}|}{f_{11}} + K\frac{|f_{21}|}{f_{22}} \quad \text{Formula 3}$$

$$= \frac{\sqrt{P_1 L_1 P_2 L_2}\,|h_{n,11}^* h_{n,12} + h_{n,21}^* h_{n,22}|}{P_1 L_1(|h_{n,11}|^2 + |h_{n,21}|^2)} +$$
$$K\frac{\sqrt{P_1 L_1 P_2 L_2}\,|h_{n,11} h_{n,12}^* + h_{n,21} h_{n,22}^*|}{P_2 L_2(|h_{n,12}|^2 + |h_{n,22}|^2)}$$

Where, K denotes a ratio of expected signal-to-noise ratios of UE1 and UE2.

It is obtained by computation that Formula 3 can take the minimum value when $P_1$ and $P_2$ meet Formula 4.

$$P_2 = \frac{K(|h_{n,11}|^2 + |h_{n,21}|^2)(h_{n,11} h_{n,12}^* + h_{n,21} h_{n,22}^*) P_1 L_1}{(h_{n,11}^* h_{n,12} + h_{n,21}^* h_{n,22})(|h_{n,12}|^2 + |h_{n,22}|^2) L_2} \quad \text{Formula 4}$$

Formula 4 shows the ratio relationship between $P_1$ and $P_2$. However, since the power may be merely increased, decreased or remain unchanged, the difference relationship between $P_1$ and $P_2$ needs to be derived. Thus, a logarithm operation is performed on Formula 4, and Formula 5 is derived as follows:

$$\beta = DB\left(\frac{K(|h_{n,11}|^2 + |h_{n,21}|^2)(h_{n,11} h_{n,12}^* + h_{n,21} h_{n,22}^*) L_1}{(h_{n,11}^* h_{n,12} + h_{n,21}^* h_{n,22})(|h_{n,12}|^2 + |h_{n,22}|^2) L_2}\right) \quad \text{Formula 5}$$

Thus, the relationship shown in Formula 6 may be obtained by performing a logarithm operation on both sides of Formula 4. In this embodiment, a DB value is taken for Formula 4, where DB represents that 10 multiplies a logarithm with 10 as the base. The difference relationship between $P_1$ and $P_2$ is obtained as:

$$P_2 = P_1 + \beta \quad \text{Formula 6}$$

$P_1$ and/or $P_2$ may need adjustment so as to meet the relationship shown in Formula 6; that is, either $P_1$ or $P_2$, or both $P_1$ and $P_2$ may be adjusted, depending on various other factors considered, for example, the locations of UE1 and UE2, and if UE1 and UE2 are located in the center of a cell and thus have almost no interference with the adjacent cells, the power of UE1 and UE2 may be increased so as to improve the transmission quality; if UE1 and UE2 are located at the edge of a cell, the power of UE1 and UE2 may be decreased so as to reduce the interference to the adjacent cells. Alternatively, the gross power control in a cell is employed, because the maximum gross power in a cell is fixed, for example, if the current gross power in the cell is much lower than the maximum threshold, especially if the gross power will not exceed its maximum threshold in the cell in the case that $P_1$ and $P_2$ are increased to some extent, the powers $P_1$ and $P_2$ may be increased so as to improve the transmission quality; if the current gross power in the cell is close to the maximum threshold, especially if the gross power will exceed the its maximum threshold in the cell in the case that $P_1$ and $P_2$ are increased, the power may be decreased so as to save the system resources. In the determination of $P_1$ and/or $P_2$, factors such as a Modulation and Coding Scheme (MCS) level, a path loss difference between the cell and its adjacent cell, large scale fading, a downlink path loss and signal-to-noise ratio are taken into consideration. Thus, the adjusted power P is determined as:

$$P = \min\left\{ \begin{array}{l} P\max,\ Target\_SINR + NI + PL + \\ \Delta_{mcs} + f(\Delta) + \sum_{i \in N} \Delta P\_VMIMO_i / N \end{array} \right\} \quad \text{Formula 7}$$

Where, $\Delta P\_VMIMO_i$ represents the size by which the power on subcarrier i needs to be adjusted, N in $$\sum_{i \in N} \Delta P\_VMIMO_i / N$$

represents the total number of subcarriers used by the UE, because UE1 and UE2 use the same time and frequency resources; Target_SINR=min{Γmax, Γ+(1−α)×ΔPathLoss}, where Γmax represents the maximum target SINR, Γ represents the target SINR at the edge of the cell, i.e., the minimum target SINR, α represents a compensation factor of path loss, and α=1 leads to a typical open loop power control, while 0<α<1 leads to a partial power control, with different values of α representing different compensation of path loss; F(Δ) represents a closed loop power correction, and F(Δ) equaling to 0 means open loop power control; Δmcs represents a parameter corresponding to the MCS level; NI represents the sum of a noise average in a period of time and an interference average in the period of time, and may be expressed as: NI=Noise+Interference; PL represents the downlink path loss measured on the UE side; and Pmax represents the maximum transmission power of the UE.

Additionally, for the calculation of $\Delta P\_VMIMO_i$, it is possible to calculate $\Delta P\_VMIMO_i$ for each subcarrier via Formula 5, etc.; alternatively, if the channel quality of each subcarrier is basically the same as that of other subcarriers and the difference between the channel quality of the subcarrier and that of the other subcarriers is in a preset range, $\Delta P\_VMIMO_i$ may be calculated for one of the subcarriers and used for the other subcarriers; alternatively, $\Delta P\_VMIMO_i$ are calculated for several selected subcarriers and then averaged, and the average is determined as $\Delta P\_VMIMO_i$ of each of all subcarriers. The calculation of $\Delta P\_VMIMO_i$ for all subcarriers used by the UE is not limited to the above, and the detailed description thereof will be omitted here.

The transmission power $P_1$ and $P_2$ to be employed by UE1 and UE2 is determined as described above, and UE1 and UE2 to be paired are selected in various modes, for example, a random pairing mode or an orthogonal pairing mode. The orthogonal pairing mode may maximize the channel capacity of the virtual MIMO system involving UE1 and UE2, and the orthogonal pairing may be implemented as follows.

First, the matrix $F_n$ is constructed with reference to Formulas 1 and 2.

Then, a matrix $G_n$ is derived based on the matrix $F_n$:

$$G_n = \frac{\det(F_n)}{tr(F_n)} \quad \text{Formula 8}$$
$$= \frac{P_1 L_1 P_2 L_2 |h_{n,11} h_{n,22} - h_{n,12} h_{n,21}|^2}{P_1 L_1 (|h_{n,11}|^2 + |h_{n,21}|^2) + P_2 L_2 (|h_{n,22}|^2 + |h_{n,12}|^2)}$$

Where, $\det(F_n)$ represents the determinant of the matrix $F_n$, and $tr(F_n)$ represents the trace of the matrix $F_n$.

Because the matrix $F_n$ is constructed for the $n^{th}$ subcarrier, and the selection of UEs according to only one subcarrier in selecting UEs to be paired may cause an inappropriate selection result, a plurality of subcarriers need to be considered, and a plurality of matrixes $G_n$ are averaged, i.e., $$\overline{G} = \frac{1}{N} \sum_{n=1}^{N} G_n, \quad \text{(Formula 9)}$$

where N represents the number of subcarriers distributed to the UEs to be paired.

The $\overline{G}$ between one UE and each of the other UEs in a set of available UEs is derived, and said one UE is paired with a UE corresponding to the maximum $\overline{G}$.

From the above description, the process of determining the uplink power of a UE and pairing user equipments may be clearly understood, and the uplink power control process will be introduced in detail in the form of flow.

Figure 2:
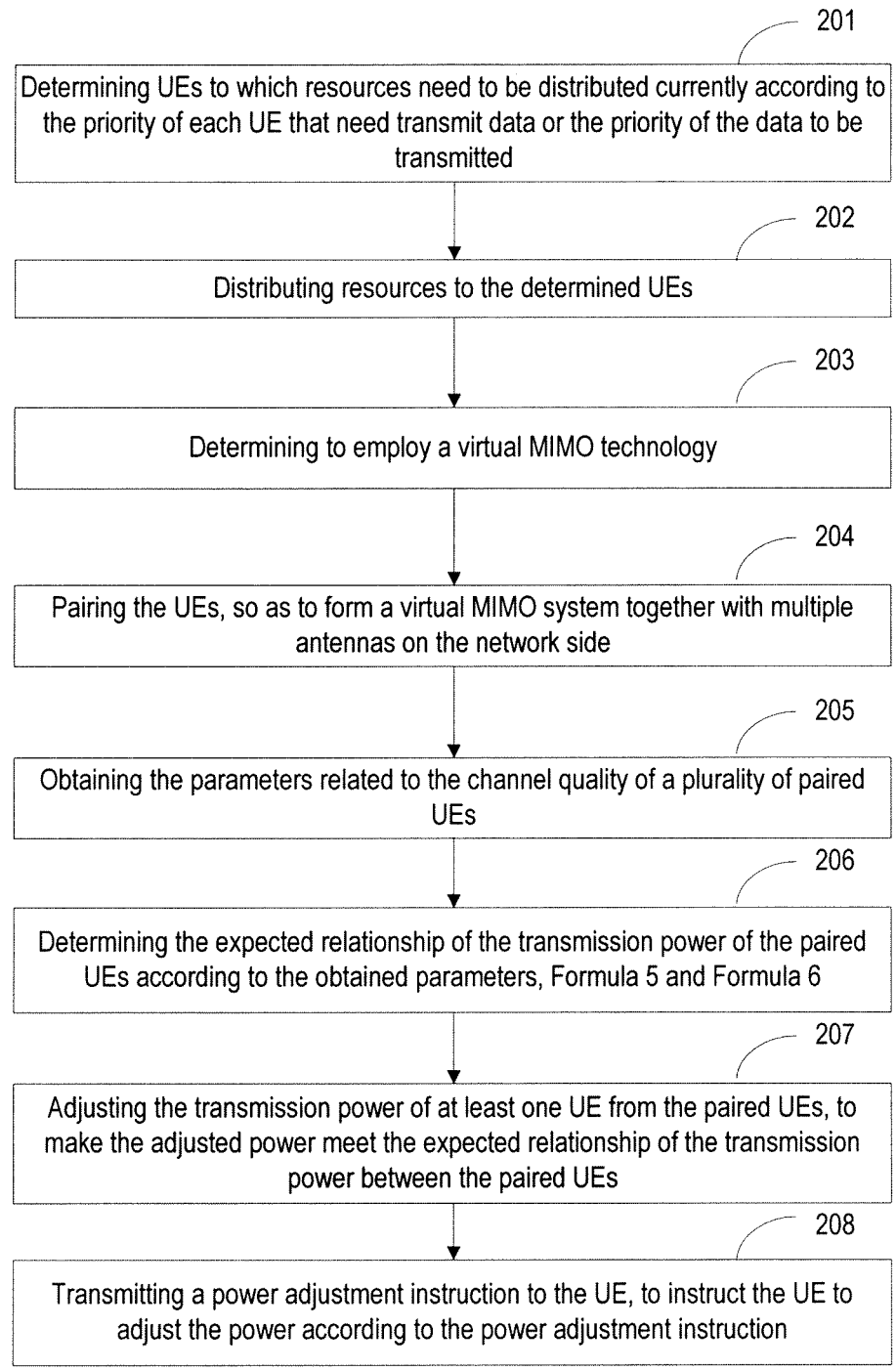
FIG. 2 is a detailed flow chart of a method for controlling uplink power according to an embodiment of the invention.

Referring to FIG. 2, the detailed flow of the method for controlling uplink power according to an embodiment is as follows.

Process 201: UEs to which resources need to be distributed currently are determined according to the priority of each UE that need transmit data or the priority of the data to be transmitted.

Process 202: Resources are distributed to the determined UEs. In this process, resources may be distributed according to a preset scheduling algorithm, and there may be various scheduling algorithms, for example, a direct proportion fairness algorithm or a polling algorithm. The direct proportion fairness algorithm refers to that resources are distributed to each UE according to factors such as signal-to-noise ratio, for example, more resources are distributed to a UE with better channel quality. The polling algorithm refers to that resources are distributed to each UE in average.

Process 203: It is determined whether a virtual MIMO technology is employed, if so, the flow proceeds to Process 204; otherwise, the flow ends.

The determination condition is that: if there is a little of traffic in the cell and the system time and frequency resources are adequate to all users, the virtual MIMO technology is not used; and if there is much traffic in the cell and service requests of some users are not met after the system resources are all distributed, these users are paired with users that occupy distributed resources using the virtual MIMO, so that the system resources are shared.

Process 204: UEs are paired, so as to form a virtual MIMO system together with multiple antennas on the network side. For example, UE1 and UE2 are paired. In this embodiment, the orthogonal pairing mode is employed.

Process 205: Parameters related to the channel quality of a plurality of paired UEs are obtained. The UEs may regularly transmit a measurement report to the network side, and the network side may obtain the parameters related to the channel quality of the UEs via the measurement report. The network side may also measure each of the parameters related to the channel quality, if applicable.

Process 206: The expected relationship of the transmission power of the paired UEs is determined according to the obtained parameters, Formula 5 and Formula 6.

Process 207: The transmission power of at least one UE from the paired UEs is adjusted, to make the adjusted power meet the expected relationship of the transmission power between the paired UEs. The amplitude and direction of the power adjustment are determined, for example, the power is lowered by 1 dB.

Process 208: A power adjustment instruction is transmitted to the UE, to instruct the UE to adjust the power according to the power adjustment instruction, with the orthogonality being met as much as possible to reduce the interference between the paired UEs.

In Processes 207 and 208, another implementing mode is employed, where the power that should be employed by the UE, rather than the adjustment amplitude of the power, is determined, and factors such as an MCS level and open and closed loop power control are considered, and the adjustment amplitude of the power is further determined in the case that the factors such as the MCS level and the open and closed loop power control are met, so that the obtained power can meet the expected relationship of transmission power between the paired UEs. Then, the network side transmits a power indication instruction to the UE, and the UE determines the uplink transmission power according to the power indication instruction.

The power adjustment instruction or the power indication instruction carrying an identifier of the UE that needs the power adjustment may be transmitted in broadcasting or multicasting mode, and the UE with an identifier the same as that carried in the received instruction performs the power adjustment according to the received instruction. The power adjustment instruction or the power indication instruction may also be transmitted in a point-to-point mode, thus the instruction is directly transmitted to the UE that needs the power adjustment.

Figure 3:
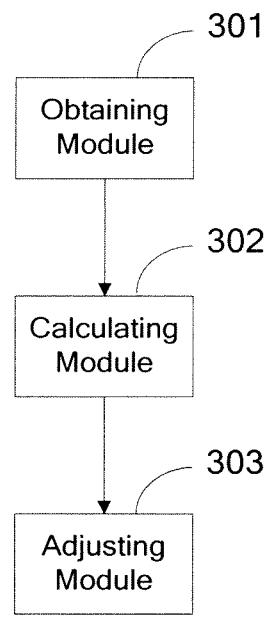
FIG. 3 is a main diagram showing a structure of a device according to an embodiment of the invention.

The implementing of uplink power control has been described above. Correspondingly, a device may be used for implementing the above method. Referring to FIG. 3, an embodiment of the invention provides a device for controlling uplink power, which includes an obtaining module 301, a calculating module 302 and an adjusting module 303. Specifically, the device may be a base station or an evolution base station.

The obtaining module 301 is adapted to determine at least two user equipments to be paired in a virtual MIMO system. The obtaining module 301 may determine the UEs to be paired by various ways, for example, the obtaining module 301 learns of the UEs to be paired via an information receipt mode (i.e. by notification) or by local pairing operation. When the obtaining module 301 determines the UEs to be paired by the local pairing operation, the obtaining module 301 includes a pairing unit for carrying out a user pairing operation.

The calculating module 302 is adapted to determine power that needs to be adjusted for the at least two user equipments according to the orthogonality between the at least two user equipments. Specifically, the calculating module 302 determines the expected relationship of transmission power of the paired UEs according to the obtained parameters, Formula 5 and Formula 6.

The adjusting module 303 is adapted to adjust the power of at least one of the at least two user equipments, to make the adjusted power meet the expected relationship of transmission power between the paired UEs.

Figure 4:
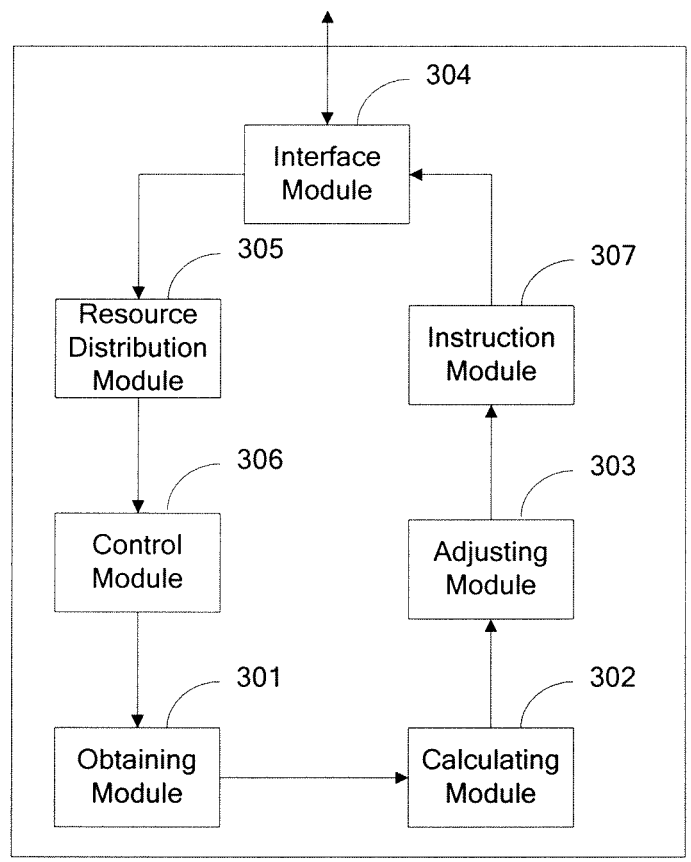
FIG. 4 is a detailed diagram showing a structure of a device according to an embodiment of the invention.

The device further includes an interface module 304, a resource distribution module 305, a control module 306 and an instruction module 307, as shown in FIG. 4.

The interface module 304 is adapted to interact with an external device, receive a measurement report reported by a UE, and transmit a power adjustment instruction or a power indication instruction to the UE.

The resource distribution module 305 is adapted to determine UEs to which resources need to be distributed currently according to the priority of each UE that need transmit data or the priority of the data to be transmitted, and distribute resources to the determined UEs.

The control module 306 is adapted to determine whether a virtual MIMO technology is to be employed, and initiate the operation of the pairing unit in the obtaining module 301 when determining that the virtual MIMO technology is to be employed.

The instruction module 307 is adapted to generate a power adjustment instruction or a power indication instruction according to the power or the adjustment amplitude of the power determined by the adjusting module 303, and to transmit the power adjustment instruction or the power indication instruction to the UE via the interface module 304.

An embodiment of the invention further provides a system for controlling uplink power, which includes:
at least two user equipments; and
an equipment on the network side, which is adapted to determine at least two user equipments to be paired in a virtual MIMO system and adjust the power of at least one of the at least two user equipments according to the orthogonality between the at least two user equipments.

The orthogonality between the at least two user equipments is determined by approximating the channel matrix of the at least two user equipments to an orthogonal matrix.

The equipment on the network side obtains the expected power relationship between the at least two user equipments by approximating the channel matrix of the at least two user equipments to an orthogonal matrix, and adjusts the power of at least one of the user equipments based on the expected power relationship between the at least two user equipments.

Software for implementing the embodiments of the invention may be stored in a storage medium such as a floppy disk, a hard disk, a compact disk and a flash memory.

In the embodiments of the invention, power control is carried out by taking the paired UEs in a virtual MIMO system as a whole, with the orthogonality of power distribution between the paried UEs being met as best as possible, to reduce the interference between the UEs, improve the transmission quality, and reduce the waste of system resources caused by meaningless power increase.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:
1. A method for controlling uplink power, comprising:
determining at least two user equipments to be paired in a virtual Multiple Input Multiple Output system; and
adjusting power of at least one of the user equipments according to orthogonality between the at least two user equipments, wherein, the orthogonality between the at least two user equipments is embodied by orthogonality of a channel matrix of the at least two user equipments, the orthogonality between the at least two user equipments is determined by approximating the channel matrix of the at least two user equipments to an orthogonal matrix, an expected power relationship between the at least two user equipments is obtained by approximating the channel matrix of the at least two user equipments to the orthogonal matrix; and the power of at least one of the at least two user equipments is adjusted based on the expected power relationship between the at least two user equipments.

2. The method according to claim 1, wherein, adjusting the power of at least one of the at least two user equipments comprises:

determining an amplitude and a direction by which the power of at least one of the at least two user equipments is to be adjusted according to the expected power relationship between the at least two user equipments; and generating an instruction for power adjustment according to the determined amplitude and direction by which the power of the at least one user equipment is to be adjusted, and transmitting the instruction to the at least one user equipment to instruct the at least one user equipment to carry out the power adjustment according to the instruction.

3. The method according to claim 2, wherein, the power adjustment on the at least one of the at least two user equipments is determined according to one or more selected from a group consisting of locations of the at least two user equipments, channel quality, cell gross-power control and large scale fading.

4. The method according to claim 1, wherein, adjusting the power of at least one of the at least two user equipments comprises:

determining power to be employed by the at least one of the at least two user equipments according to the expected power relationship between the at least two user equipments with reference to a value of a channel quality-related parameter; and generating an instruction for power indication according to the determined power to be employed by the at least one user equipment, and transmitting the instruction to the at least one user equipment, to instruct the at least one user equipment to carry out power adjustment according to the instruction.

5. The method according to claim 4, wherein, the power adjustment on the at least one of the at least two user equipments is determined according to one or more selected from a group consisting of locations of the at least two user equipments, channel quality, cell gross-power control and large scale fading.

6. A device for controlling uplink power, comprising:

an obtaining module, adapted to determine at least two user equipments to be paired in a virtual Multiple Input Multiple Output system;

a calculating module, adapted to determine a size of by which power for the at least two user equipments is to be adjusted according to orthogonality between the at least two user equipments; and an adjusting module, adapted to adjust power of at least one of the user equipments according to the determined size by which the power is to be adjusted, wherein, the orthogonality between the at least two user equipments is embodied by orthogonality of a channel matrix of the at least two user equipments, the orthogonality between the at least two user equipments is determined by approximating the channel matrix of the at least two user equipments to an orthogonal matrix, and the calculating module obtains an expected power relationship between the at least two user equipments by approximating the channel matrix of the at least two user equipments to an orthogonal matrix, and determines the size by which the power is to be adjusted for the at least two user equipments based on the expected power relationship between the at least two user equipments.

7. The device according to claim 6, wherein, the adjusting module is further adapted to determine an amplitude and a direction by which the power of at least one of the at least two user equipments is to be adjusted according to the expected power relationship between the at least two user equipments, and generate an instruction for power adjustment according to the determined amplitude and direction by which the power of the at least one user equipment is to be adjusted, and transmit the instruction to the at least one user equipment to instruct the at least one user equipment to carry out the power adjustment according to the instruction.

8. The device according to claim 6, wherein, the adjusting module is further adapted to determine power to be employed by the at least one of the at least two user equipments according to the expected power relationship between the at least two user equipments with reference to a value of a channel quality-related parameter, generate an instruction for power indication according to the determined power to be employed by the at least one user equipment, and transmit the instruction to the at least one user equipment, to instruct the at least one user equipment to carry out power adjustment according to the instruction.

9. A system for controlling uplink power, comprising:

at least two user equipments; and an equipment on network side, adapted to determine at least two user equipments to be paired in a virtual Multiple Input Multiple Output system and adjust power of at least one of the user equipments according to orthogonality between the at least two user equipments, wherein, the orthogonality between the at least two user equipments is determined by approximating a channel matrix of the at least two user equipments to an orthogonal matrix; and the equipment on network side obtains an expected power relationship between the at least two user equipments by approximating the channel matrix of the at least two user equipments to an orthogonal matrix, and adjusts power of at least one of the user equipments based on the expected power relationship between the at least two user equipments.

10. The system according to claim 9, wherein, the equipment on network side further determines an amplitude and a direction by which the power of at least one of the at least two user equipments is to be adjusted according to the expected power relationship between the at least two user equipments, and generates an instruction for power adjustment according to the determined amplitude and direction by which the power of the at least one user equipment is to be adjusted, and transmits the instruction to the at least one user equipment to instruct the at least one user equipment to carry out the power adjustment according to the instruction.

11. The system according to claim 9, wherein, the equipment on network side further determines power to be employed by the at least one of the at least two user equipments according to the expected power relationship between the at least two user equipments with reference to a value of a channel quality-related parameter, generates an instruction for power indication according to the determined power to be employed by the at least one user equipment, and transmits the instruction to the at least one user equipment, to instruct the at least one user equipment to carry out power adjustment according to the instruction.

\* \* \* \* \*